Nov. 28, 1961 S. LOEWE ET AL 3,011,031

ARRANGEMENT OF MAGNETIC HEADS FOR TAPE RECORDERS

Filed Oct. 8, 1956

Inventors:
Siegmund Loewe
Werner Zorn

United States Patent Office 3,011,031
Patented Nov. 28, 1961

3,011,031
ARRANGEMENT OF MAGNETIC HEADS FOR TAPE RECORDERS

Siegmund Loewe, 68 Ridge Road, Yonkers, N.Y., and Werner Zorn, Berlin-Zehlendorf-West, Germany; said Zorn assignor to said Loewe Filed Oct. 8, 1956, Ser. No. 614,758
Claims priority, application Germany Oct. 12, 1955
1 Claim. (Cl. 179—100.2)

In principle, the recording process on a magnetic tape proceeds in a manner whereat an erasing head precedes the recording head which is moved relatively to the magnetic tape and this erasing head erases the already existent recording. This necessary sequence in the operation of the erasing head and recording head necessitates, with multi-track tapes, a reversal of the arrangement between recording head and erasing head, i.e. in particular, between the recording gap and the erasing gap. In the arrangements known, this reversal is made either mechanically or electrically. In the latter case, an erasing gap must then be provided on both sides of the recording gap (viewed in the direction of tape travel) and the erasing gap which is then, during the movement of the tape relative to the heads, behind the recording head or gap must be disconnected so that the recording just made is not immediately erased. Both the mechanical reversal of the sequence between recording and erasing gap and the electrical switch-over means are expensive and also render more difficult an exact location of the head relative to the magnetic tape.

The present invention offers a more advantageous solution of the problem described. It deals with an arrangement of the magnetic heads for recording, reproduction and erasing for magnetic tapes with some or many tracks and is characterized in that, besides the operation gap recording or reproduction gap) in contact with the first of two or more tracks and the erasing gap arranged before this in the usual way in the relative scanning direction, an additional erasing gap is provided which is respectively in contact with the next track or the next tracks. This arrangement of the magnetic heads can thus be so chosen that, on scanning of a magnetic tape with several tracks lying parallel to each other, it is only necessary to make a shifting transverse to the direction of the track, as soon as one track has finished its travel, not, however, a reversal of the spatial sequence of the gaps, that is e.g. a rotation.

With this new arrangement, it is possible, on recording of a track on the magnetic tape, to erase the track which then comes next, provided that there is a former recording on this which is to be replaced by the new recording.

Figure 1:
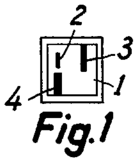
Figure 2:
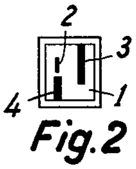

The principle of the invention as also further details as to this are afforded by the appended drawing which shows in FIGS. 1 and 2 two schematically represented arrangements of the magnetic head gaps in accordance with the invention, in FIGS. 3 to 7 several phases of the scanning of a multi-track tape in connection with the recording process.

FIGURE 1 and 2 show, on a somewhat enlarged scale, a side view of the new arrangement of the magnetic heads along which the magnetic tape is moved past. The front surface 1 of the arrangement shows an operation gap 2 formed in the usual way and belonging to a combined recording-reproduction magnetic head which is made as narrow as possible and with a length which corresponds to the width of the track to be recorded. Near to this operation gap 2, an erasing gap 3 is arranged in such a way that, during the movement of the magnetic tape relative to the head arrangement, gap 3 comes into contact with the first track before the operation gap 2 and thus erases a recording already existent on this first track. In the lower part of the surface 1 of the head arrangement directed towards the tape, a second erasing gap is now provided in accordance with the invention and is designated with 4. This additional erasing gap 4 is of such size and so arranged that, on scanning of the tape, it comes into contact with that track which lies beside the track which is in contact with the gaps 2 and 3.

FIG. 2 shows, in principle, the same track arrangement as FIG. 1, however with the difference that, according to FIG. 2, the erasing gaps are made longer so that, seen from the transverse direction, they overlap each other by a small amount.

If desired, the arrangement according to FIGS. 1 and 2 can be altered in such a way that the additional erasing head 4 is made so long that it comes into contact with several of the tracks simultaneously which are adjacent to the track in contact with the gaps 2 and 3.

Figure 3:
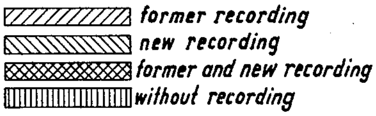
Figure 3:
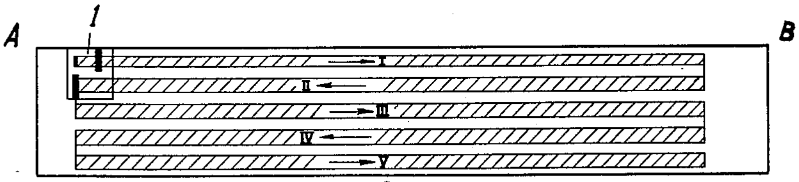

In FIGS. 3 to 7 can be seen, in each case, a magnetic tape A—B, shown considerably shortened, the width of which is represented on an enlarged scale. It is so made that five parallel sound tracks can be recorded on it parallel to each other. In FIGS. 3 to 7, it is presupposed that a former recording is on all of these five tracks I–V. It is now shown how, by means of the new head arrangement, an erasing of the existent tracks and a recording of a new content proceeds:

According to FIG. 3, the magnetic head arrangement 1, as shown in FIG. 1, which is first at the upper end of the tape at the left hand side, moves from end A to end B for operation on the upper track I. Here, the relative movement is meant since the head arrangement actually remains fixed and it is the tape which moves past it.

Figure 4:
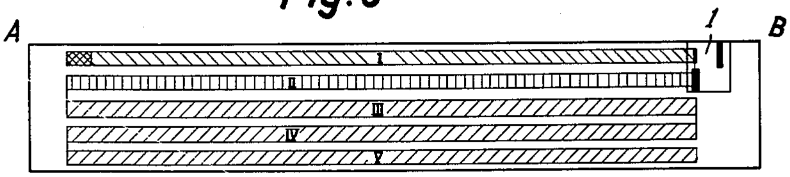

On reaching the right hand end of the track at B, the head arrangement 1 is in the position shown in FIG. 4 and has, thus, erased the former track I by means of the erasing gap 3 and has made a new recording on this track by means of the operation gap 2. At the same time, the erasing gap 4 has erased the whole track II.

Figure 5:
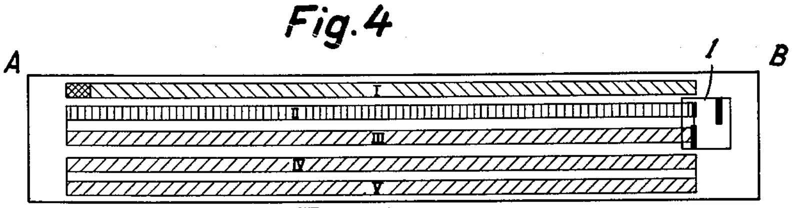

Now, a movement of the head arrangement relative to the tape is made transverse to the direction of the tape so that the position shown in FIG. 5 is reached. At the same time, the erasing gap 3 provided only for track I is put out of operation.

When now a movement of the heads relative to tape is made from the end B to the end A, then the operation gap 2 produces a new recording on track II from which the former recording was previously erased. At the same time, the erasing gap 4 erases the former recording on track III.

Figure 6:
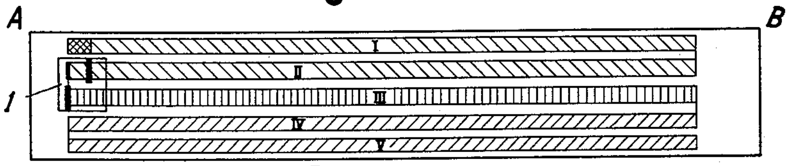

When according to FIG. 6, the end of the tape A is again reached, then track II is provided with the new recording and the former recording on track III has been erased.

Figure 7:
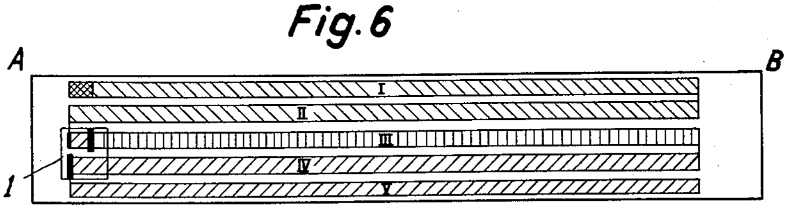

After the head arrangement has been once again shifted by the distance between the tracks—see FIG. 7, the same process is repeated, i.e. the operation gap 2 always meets with an erased track which has been erased by the additional gap 4 during the previous scanning.

Certain alterations are possible within the scope of the invention: for example, the additional erasing gap, in so far as it comes into contact with several individual tracks, can be divided into an equal number of individual gaps which can be disconnected independent from each other, as desired, so that it is possible for the user, during the recording of one track, to erase one or more of the adjacent tracks. The first erasing head 3, arranged on the same track level as the operation gap, is best put out of operation automatically after erasing the first track of the tape—e.g. by making use of the transverse movement of the head arrangement by one track width.

What we claim is:

An electromagnetic transducer head assembly usable in cooperation with a magnetic sound tape carrying more than one sound track lying in parallel comprising in combination a record-playback head with a pair of pole-pieces forming one record-playback gap, and two erasing heads, each with a pair of pole-pieces forming one erasing gap, said record-playback head with said recording-playback gap and one of both said erasing heads being arranged side by side with their gaps in parallel and both lying in the longitudinal direction of one and the same cooperating sound track, thus being enabled to scan this track, the second of said erasing heads being arranged adjacent said record-playback head in longitudinal direction of their gaps and in continuation of the gap of said record-playback gap, and further thus located that its gap is enabled to scan the next sound track on the cooperating sound tape, the pole-pieces of said erasing heads have such a length that they are adapted to overlap each other on the side of the adjacent ends of their gaps with their magnetic effect on the cooperating tape.

References Cited in the file of this patent

UNITED STATES PATENTS

| | | |
|---|---|---|
| 2,561,338 | Camras | July 24, 1951 |
| 2,679,551 | Newby | May 25, 1954 |
| 2,700,588 | Williams | Jan. 25, 1955 |
| 2,736,776 | Camras | Feb. 28, 1956 |
| 2,751,274 | Andrews | June 19, 1956 |
| 2,793,253 | Howey | May 21, 1957 |